(12) United States Patent
Prioul et al.

(10) Patent No.: US 9,625,599 B2
(45) Date of Patent: Apr. 18, 2017

(54) DOWNHOLE ELASTIC ANISOTROPY MEASUREMENTS

(71) Applicant: Schlumberger Technology Corporation, Sugar Land, TX (US)

(72) Inventors: Romain C. A. Prioul, Somerville, MA (US); David L. Johnson, Somerville, MA (US); Ralph M. D'Angelo, Weymouth, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 226 days.

(21) Appl. No.: 14/108,649

(22) Filed: Dec. 17, 2013

(65) Prior Publication Data
US 2015/0168580 A1    Jun. 18, 2015

(51) Int. Cl.
*G01V 1/44*    (2006.01)
*G01V 1/48*    (2006.01)
*G01V 1/46*    (2006.01)

(52) U.S. Cl.
CPC .............. *G01V 1/48* (2013.01); *G01V 1/44* (2013.01); *G01V 1/46* (2013.01); *G01V 2200/16* (2013.01); *G01V 2210/6222* (2013.01); *G01V 2210/6242* (2013.01)

(58) Field of Classification Search
CPC .......... G01V 1/44; G01V 1/4837; G01V 1/48; G01V 1/46; G01V 2210/6222; G01V 2210/6242; G01V 2200/16
USPC .......................................................... 367/25
See application file for complete search history.

(56) References Cited

U.S. PATENT DOCUMENTS

| | | | |
|---|---|---|---|
| 4,130,816 A | 12/1978 | Vogel et al. | |
| 4,293,934 A * | 10/1981 | Herolz ...................... | G01V 1/46 346/33 WL |
| 4,594,691 A | 6/1986 | Kimball et al. | |
| 4,641,724 A | 2/1987 | Chow et al. | |
| 5,214,613 A | 5/1993 | Esmersoy | |
| (Continued) | | | |

FOREIGN PATENT DOCUMENTS

WO    2013016470 A2    1/2013

OTHER PUBLICATIONS

International Search Report and the Written Opinion for International Application No. PCT/US2014/069468 dated Apr. 1, 2015.

(Continued)

*Primary Examiner* — Daniel L Murphy (57) ABSTRACT

A downhole acoustic logging tool includes at least one acoustic transmitter and first and second arrays of acoustic receivers deployed on a tool body. The first array of acoustic receivers includes a plurality of axially spaced apart acoustic receivers and the second array of acoustic receivers includes a plurality of circumferentially spaced apart acoustic receivers. A method for making downhole acoustic logging measurements of a subterranean formation includes causing an acoustic logging tool to obtain axial acoustic logging measurements and circumferential acoustic logging measurements. The axial acoustic logging measurements and the circumferential acoustic logging measurements are then processed to compute each of five elastic constants of a transversely isotropic medium.

3 Claims, 4 Drawing Sheets

(56) References Cited

U.S. PATENT DOCUMENTS

| | | | |
|---|---|---|---|
| 5,521,882 A * | 5/1996 | D'Angelo | G01V 1/52 324/335 |
| 5,544,127 A | 8/1996 | Winkler | |
| 5,808,963 A | 9/1998 | Esmersoy | |
| 6,088,294 A | 7/2000 | Leggett, III et al. | |
| 6,510,389 B1 | 1/2003 | Winkler et al. | |
| 6,614,360 B1 | 9/2003 | Leggett, III et al. | |
| 6,678,616 B1 | 1/2004 | Winkler et al. | |
| 6,714,480 B2 | 3/2004 | Sinha et al. | |
| 7,624,760 B2 | 12/2009 | Monk et al. | |
| 2005/0078555 A1 | 4/2005 | Tang et al. | |
| 2009/0210160 A1 | 8/2009 | Suarez-Rivera et al. | |
| 2011/0188345 A1 | 8/2011 | Wang | |
| 2011/0286307 A1 | 11/2011 | Wang | |
| 2012/0026831 A1 * | 2/2012 | Mickael | G01V 1/46 367/25 |
| 2012/0078600 A1 | 3/2012 | Horne et al. | |

OTHER PUBLICATIONS

Botter "Circumferential acoustic waves in bore holes for the delineation of vertical fractures," Society of Petrophysicists & Well Log Analysts Twenty-Third Annual Logging Symposium, Jul. 6-9, 1982, pp. 1-21.

Botter, et al. "Circumferential propagation of acoustic boundary waves in boreholes," J. Acoust. Soc. Am., vol. 71, Issue 4, Apr. 1982, pp. 790-795.

Degrange, et al. "LWD tool provides reliable shear slowness measurements," E&P, Hart Energy, Jun. 2011.

Degrange, et al. "Sonic While Drilling: Multipole Acoustic Tools for Multiple Answers," IADC/SPE 128162, IADC/SPE Drilling Conference and Exhibition, Feb. 2-4, 2010, New Orleans, Louisiana, USA, pp. 1-11.

Guy, et al. "The Use of Circumferentially Propagated Acoustic Waves in Well Logging," SPE 15484, SPE Annual Technical Conference and Exhibition, Oct. 5-8, 1986, New Orleans, Louisiana, pp. 1-15.

McDougall, et al. "Circumferential Acoustic Logging in Canada," Society of Petroleum Engineers, Annual Technical Meeting, Jun. 7-10, 1987, Calgary, Alberta, pp. 1101-1112.

Pistre, et al. "A new modular sonic tool provides complete acoustic formation characterization," 75th Annual International Meeting, SEG Houston 2005, pp. 368-372.

Setser "Fracture Detection by Circumferential Propagation of Acoustic Energy," SPE Annual Technical Conference and Exhibition, Oct. 4-7, 1981, San Antonio, Texas, SPE 10204, 8 pages.

Winkler, et al. "Ultrasonic borehole velocity imaging," Geophysics, vol. 71, No. 3, May-Jun. 2006, pp. F25-F30.

Orion, M. and Plona, T. J., 1983, Circumferential wave propagation in a fluid filled borehole: Theory, J. Acoust. Soc. Am. vol. 73, Issue S1, p. S69. (Abstract Only).

Plona, T. J. and Orton, M. and Kleinberg, R. L. and Chow, E. Y., 1983, Circumferential wave propagation in a fluid filled borehole: Experiment, J. Acoust. Soc. Am. vol. 73, Issue S1, p. S69. (Abstract Only).

International Preliminary Report on Patentability issued in related PCT application PCT/US2014/069468 on Jun. 30, 2016, 13 pages.

* cited by examiner

DOWNHOLE ELASTIC ANISOTROPY MEASUREMENTS

CROSS REFERENCE TO RELATED APPLICATIONS

None.

FIELD OF THE INVENTION

Disclosed embodiments relate generally to downhole acoustic measurements and more particularly to the determination of subsurface elastic anisotropy using borehole acoustic measurements having wave propagation in both the axial and circumferential directions.

BACKGROUND INFORMATION

The use of acoustic measurement systems in prior art downhole applications, such as logging while drilling (LWD) and wireline logging applications is well known. In one application, acoustic signals may be generated at one or more transmitters deployed in the borehole. These acoustic signals may then be received at an array of longitudinally spaced receivers deployed in the borehole. Acoustic logging in this manner provides an important set of borehole data and is commonly used in both LWD and wireline applications to determine compressional and shear wave velocities (also referred in the art in terms of their slowness values) of a formation. These velocities may then be used to compute certain elastic constants of the formation.

Many subterranean formations exhibit elastic anisotropy that may be intrinsic, for example, owing to orientation and layering of sediments (e.g., in shales) or may be induced by the presence of fractures or the stress sensitivity of the formation. Such formations are commonly modeled as being transversely isotropic media having five elastic constants. However, conventional axial acoustic measurements only enable three (or occasionally four) of these five elastic constants to be determined. The remaining constant(s) are sometimes inferred from various assumptions about the geophysics of the formation; however, such inferences can be problematic. Therefore, there is a need in the art for a downhole acoustic measurement system and methodology for directly determining the five elastic constants of a transversely isotropic medium.

SUMMARY

A downhole acoustic logging tool includes at least one acoustic transmitter and first and second arrays of acoustic receivers deployed on a tool body. The first array of acoustic receivers includes a plurality of axially spaced apart acoustic receivers and the second array of acoustic receivers includes a plurality of circumferentially spaced apart acoustic receivers. The tool may further optionally include a processor configured to process axial and circumferential acoustic logging measurements to compute each of five elastic constants of a transversely isotropic medium.

A method for making downhole acoustic measurements of a subterranean formation includes causing an acoustic logging tool to obtain axial acoustic logging measurements and circumferential acoustic logging measurements. The axial acoustic logging measurements and the circumferential acoustic logging measurements are then processed to compute each of five elastic constants of a transversely isotropic medium.

The disclosed embodiments may provide various technical advantages. For example, the disclosed logging apparatus and method enable the five elastic constants of a transversely isotropic formation to be directly determined without using geophysical inferences or assumptions. Moreover, these constants may be determined and transmitted to the surface in real time while drilling. Furthermore, in certain embodiments, a sufficient number of acoustic measurements may be made so as to over specify the system and improve the reliability and accuracy of the determined elastic constants.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 6-8 depict the acoustic logging tool shown on FIG. 1 deployed in a transversely isotropic formation.

DETAILED DESCRIPTION

Figure 1:
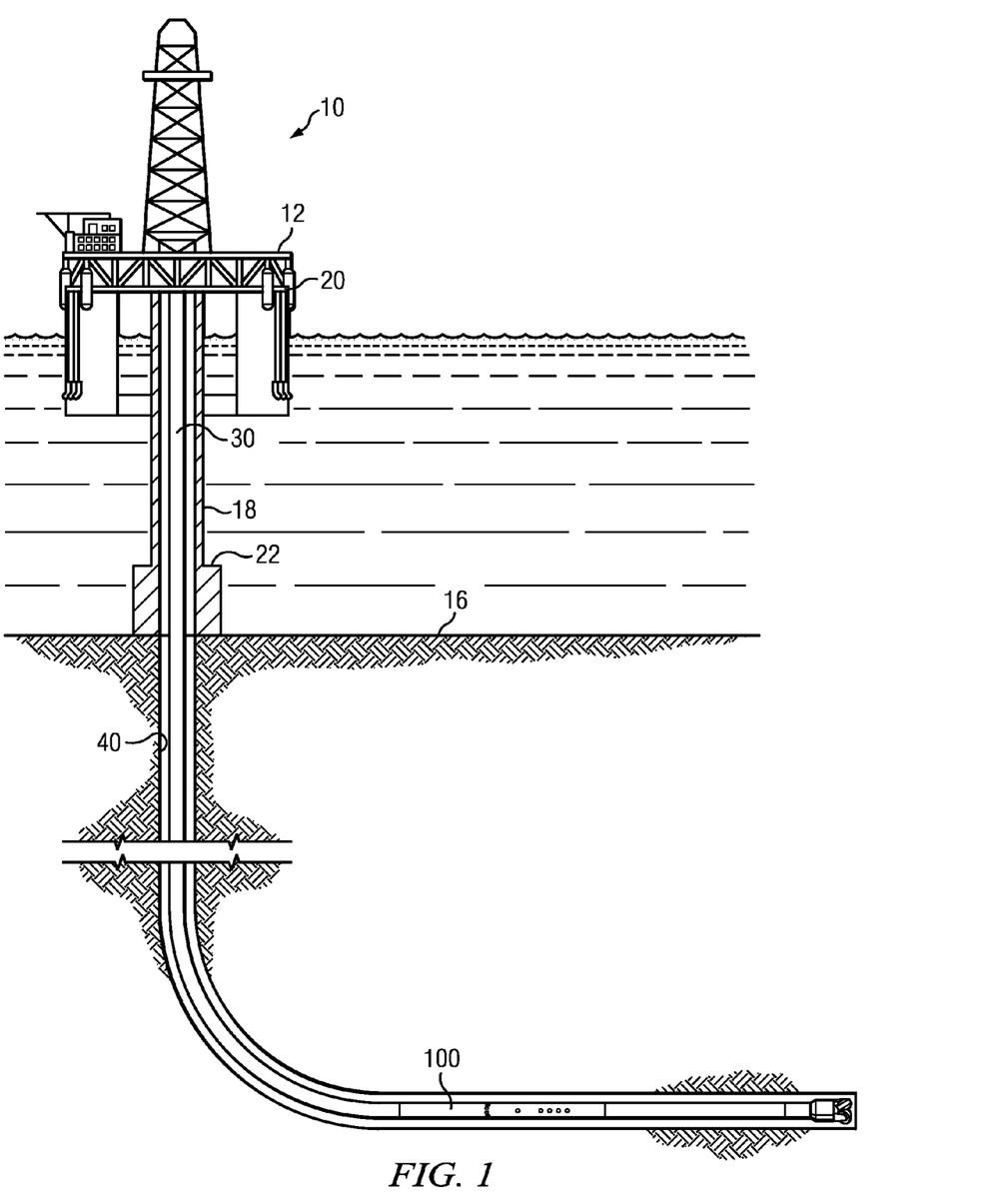
FIG. 1 depicts an example drilling rig on which disclosed embodiments may be utilized.

FIG. 1 depicts an example drilling rig 10 on which various disclosed acoustic logging tool and acoustic logging methods may be utilized. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes an acoustic logging tool 100. The drill string may further include substantially any other suitable downhole tools such as other logging tools, a measurement while drilling tool, a rotary steerable tool, a downhole drilling motor, a downhole telemetry system, a reaming tool, and the like. The disclosed embodiments are not limited in these regards.

It will be understood by those of ordinary skill in the art that the deployment illustrated on FIG. 1 is merely an example. The disclosed embodiments are not limited to use with a semisubmersible platform 12 as illustrated on FIG. 1, but are equally well suited for use with any kind of subterranean drilling operation, either offshore or onshore. Nor are the disclosed embodiments limited to use with drill string conveyance. It will be understood that the disclosed embodiments are also equally well suited for use with coiled tubing and wireline conveyance. It is particularly noted that the disclosed embodiments may include both LWD and wireline systems and methods.

Figures 2, 3, 4, 5:
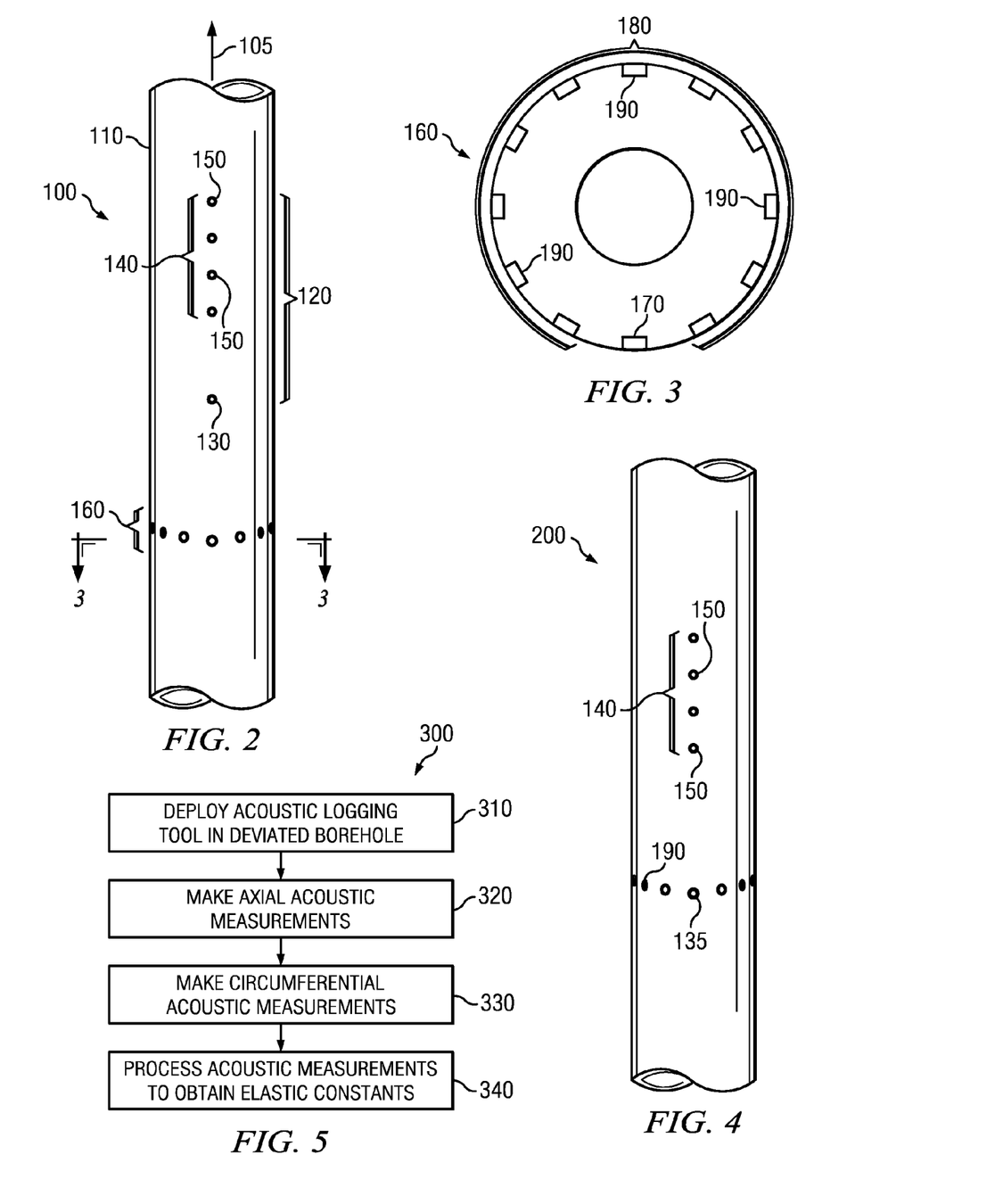
FIG. 2 depicts one example of a disclosed downhole acoustic measurement system.
FIG. 3 depicts a cross-sectional view of the downhole acoustic measurement system shown on FIG. 2.
FIG. 4 depicts another example of a disclosed downhole acoustic measurement system.
FIG. 5 depicts a flow chart of a disclosed method embodiment.

FIG. 2 depicts one embodiment of the downhole acoustic logging tool 100 shown on FIG. 1. Acoustic logging tool 100 includes a substantially cylindrical tool body 110, which is largely symmetrical about a cylindrical axis 105. The tool body 110 may be an LWD tool body configured for coupling with a drill string (e.g., including threaded end portions) or a wireline tool body configured for deployment at the end of a wireline cable. Logging tool 100 includes an axial acoustic measurement module 120 and a circumferential measurement module 160. The axial measurement module includes at least one acoustic transmitter 130 axially spaced apart from a linear array 140 of axially spaced receivers 150. It will be understood that such a transmitter may be "above" or "below" the array 140. While not depicted it will be further understood that the acoustic measurement module may also include first and second transmitters deployed on opposing axial ends of the array 140 of axially spaced receivers 150. It will also be understood that while the embodiment shown includes an axial array 140 having four receivers 150 that the disclosed embodiments are not limited to any particular number of receivers.

With further reference to FIG. 3, acoustic logging tool 100 further includes a circumferential measurement module 160 which includes at least one transmitter 170 circumferentially spaced apart from a circumferential array 180 of acoustic receivers 190. It will also be understood that while the embodiment shown includes a circumferential array 180 having eleven receivers 190 that the disclosed embodiments are not limited to any particular number of receivers, nor to an array having any particular circumferential (azimuthal) coverage. While the disclosed embodiments are not limited to any particular number of circumferential receivers, it is generally desirable to have as many circumferential receivers as possible. However increasing the number of receivers tends to increase the complexity and cost of the tool and may compromise structural integrity (especially in LWD embodiments). Thus there are physical constraints that may practically limit the number of circumferential receivers employed.

FIG. 4 depicts another downhole acoustic logging tool embodiment 200. Acoustic logging tool 200 is similar to acoustic logging tool 100 in that it includes an axial acoustic measurement module and a circumferential measurement module; however acoustic logging tool 200 differs from acoustic logging tool 100 in that the axial and circumferential measurement modules share a common transmitter 135. As depicted the transmitter 135 is axially spaced apart from the linear array 140 of acoustic receivers 150 and circumferentially spaced apart from the circumferential array of acoustic receivers 190. Transmitter 135 is also deployed at a common circumferential position with the linear array 140 of acoustic receivers 150 and a common axial position with the circumferential array of acoustic receivers 190. In this way a single transmitter firing may be used to obtain both axial and circumferential acoustic logging data. In other words the acoustic signals propagated by transmitter 135 may be received by the receivers in the axial measurement module and the circumferential measurement module.

It will be understood that transmitters 130, 135, and 170 may include substantially any suitable acoustic transmitter configured for use in downhole logging operations. Moreover, the transmitter(s) may be configured to transmit substantially any suitable acoustic signal having substantially any frequency band. For example, the transmitters 130, 135, and 170 may be configured to transmit ultrasonic acoustic energy (such as having a frequency in a range from about 30 kHz to about 2.0 MHz).

FIG. 5 depicts a flow chart of one disclosed method embodiment 300 for measuring the five elastic constants of a transverse isotropic media. An acoustic logging tool such as logging tool 100 (FIGS. 2 and 3) or logging tool 200 (FIG. 4) may be deployed in a deviated subterranean borehole at 310 (by deviated it is meant that the borehole is not aligned with the vertical axis (also referred to in the art as a symmetry axis) of a transversely isotropic medium or is non-vertical in a VTI medium). Axial acoustic measurements are made at 320 to obtain compressional and shear wave velocities for acoustic energy propagating in the axial direction. Circumferential acoustic measurements are made at 330 to obtain at least one of a compressional wave velocity or a shear wave velocity for acoustic energy propagating in the cross-axial direction (about the circumference of the acoustic measurement tool). It will be understood that the axial acoustic measurements and the circumferential acoustic measurements may be made sequentially in any order and/or simultaneously. The velocities obtained at 320 and 330 are then processed in combination at 340 to compute each of the five elastic constants of a transverse isotropic media.

Axial acoustic measurements may be obtained at 320, for example, via firing a transmitter that is axially spaced apart from a receiver array (such as transmitter 130 or 135) to propagate an acoustic signal in the borehole (and subterranean formation). The acoustic signal is then received at individual receivers in the axial receiver array 140. The velocities of various acoustic waves (e.g., the compressional and shear waves) may then be determined using techniques known to those of ordinary skill in the art (e.g., using semblance or phase velocity algorithms).

Circumferential acoustic signals may be obtained at 330, for example, via firing a transmitter that is circumferentially spaced apart from a receiver array (such as transmitter 135 or 170) to propagate an acoustic signal in the borehole (and subterranean formation). The acoustic signal is then received at individual receivers in the circumferential receiver array 180. The velocities of various acoustic waves (e.g., the compressional and shear waves) may be determined at the individual receivers to obtain the velocities as a function of the azimuthal angle (the tool face angle) about the circumference of the tool. These velocities may also be determined, for example, using semblance or phase velocity algorithms. For example, if a velocity at receiver R3 (located at a tool face angle of 90 degrees in FIG. 3) is desired a semblance algorithm may be processed over a circumferential array including receivers R2, R3, and R4. A velocity at receiver R4 may be obtained by processing a semblance algorithm over a circumferential array including receivers R3, R4, and R5. A velocity at receiver R5 may be obtained by processing a semblance algorithm over a circumferential array including receivers R4, R5, and R6. And so on. In this way, the azimuthal dependence of the velocity may be obtained. It will be readily understood by those of ordinary skill that such semblance algorithms are not limited to use with three adjacent receivers, but may be used with any plurality (two or more) of receivers.

As stated above, a transversely isotropic media may be characterized by five independent elastic constants, for example, as given in Equation 1:

$$c_{(TI)} = \begin{bmatrix} c_{11} & c_{12} & c_{13} & 0 & 0 & 0 \\ c_{12} & c_{11} & c_{13} & 0 & 0 & 0 \\ c_{13} & c_{13} & c_{33} & 0 & 0 & 0 \\ 0 & 0 & 0 & c_{55} & 0 & 0 \\ 0 & 0 & 0 & 0 & c_{55} & 0 \\ 0 & 0 & 0 & 0 & 0 & c_{66} \end{bmatrix} \quad \text{Equation 1}$$

where $c_{(TI)}$ represents the elastic stiffness tensor of the transversely isotropic media and $c_{11}$, $c_{33}$, $c_{55}$, $c_{66}$, $c_{12}$, and $c_{13}$ represent the corresponding elastic constants. Although six constants are listed in the elastic stiffness tensor $c_{(TI)}$ only five of the constants are independent as $c_{12}=c_{11}-2c_{66}$. Thus, $c_{11}$, $c_{33}$, $c_{55}$, $c_{66}$, and $c_{13}$ are generally considered to be the five independent elastic constants of $c_{(TI)}$.

Four of these five elastic constants (also commonly referred to as moduli) are directly related to the squared speeds for wave propagation in the directions along the TI symmetry axis or orthogonal to it (which may be the vertical and horizontal directions, respectively when the TI axis is vertical in so-called VTI media). The velocity of various acoustic waves may be given, for example in a VTI medium, as follows:

$$V_{11} = \sqrt{c_{11}/\rho} \quad \text{Equation 2}$$

$$V_{12} = \sqrt{c_{66}/\rho} \quad \text{Equation 3}$$

$$V_{13} = V_{31} = \sqrt{c_{55}/\rho} \quad \text{Equation 4}$$

$$V_{33} = \sqrt{c_{33}/\rho} \quad \text{Equation 5}$$

where $V_{11}$ represents the velocity of a horizontally propagating compressional wave, $V_{12}$ represents the velocity of a horizontally propagating shear wave having a horizontal polarization, $V_{13}$ represents the velocity of a vertically propagating shear wave having a horizontal polarization (or the symmetrical horizontally propagating shear wave having a vertical polarization), $V_{33}$ represents the velocity of a vertically propagating compressional wave, and $\rho$ represents the density of the formation. The fifth constant $c_{13}$ cannot generally be estimated directly from a single measured wave velocity.

For completeness, the inverse of the elastic stiffness tensor is referred to as the elastic compliance tensor and may be expressed for a transversely isotropic medium, for example, as follows:

$$s_{(TI)} = c_{(TI)}^{-1} = \begin{bmatrix} s_{11} & s_{12} & s_{13} & 0 & 0 & 0 \\ s_{12} & s_{11} & s_{13} & 0 & 0 & 0 \\ s_{13} & s_{13} & s_{33} & 0 & 0 & 0 \\ 0 & 0 & 0 & s_{55} & 0 & 0 \\ 0 & 0 & 0 & 0 & s_{55} & 0 \\ 0 & 0 & 0 & 0 & 0 & s_{66} \end{bmatrix} \quad \text{Equation 6}$$

where $s_{(TI)}$ represents the elastic compliance tensor and $s_{11}$, $s_{33}$, $s_{55}$, $s_{66}$, $s_{12}$, and $s_{13}$ represent the corresponding compliance constants. The elastic compliance tensor may also be expressed as a function of the classical Young's moduli ($E_H$ and $E_V$), shear moduli ($G_H$ and $G_V$) and Poisson's ratios ($v_H$ and $v_V$) for a transversely isotropic medium, for example, as follows:

$$s_{(TI)} = c_{(TI)}^{-1} = \begin{bmatrix} 1/E_H & -v_H/E_H & -v_V/E_V & 0 & 0 & 0 \\ -v_H/E_H & 1/E_H & -v_V/E_V & 0 & 0 & 0 \\ -v_V/E_V & -v_V/E_V & 1/E_V & 0 & 0 & 0 \\ 0 & 0 & 0 & 1/G_V & 0 & 0 \\ 0 & 0 & 0 & 0 & 1/G_V & 0 \\ 0 & 0 & 0 & 0 & 0 & 1/G_H \end{bmatrix} \quad \text{Equation 7}$$

Figure 6A:
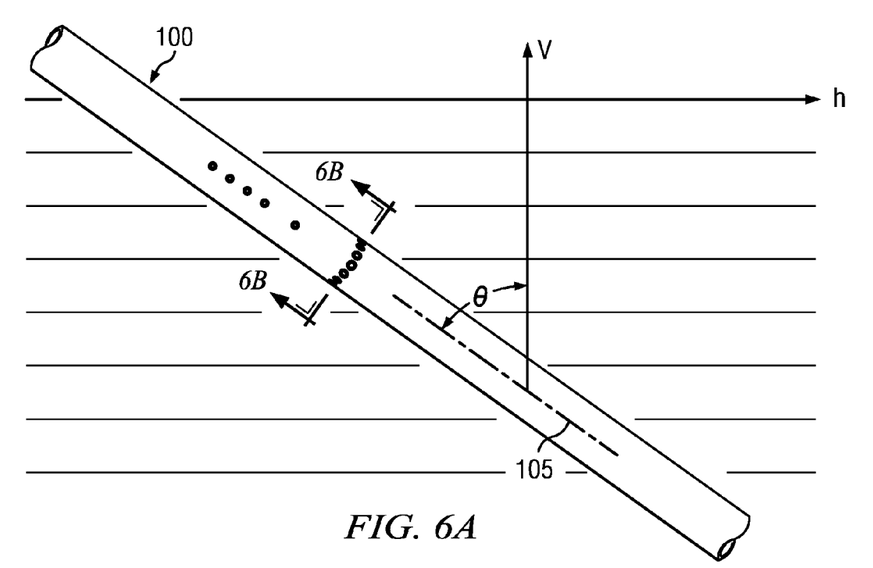
FIGS. 6A and 6B depict a general case in which the borehole (and therefore the acoustic logging tool) is deviated with respect to the vertical axis.
Figure 6B:
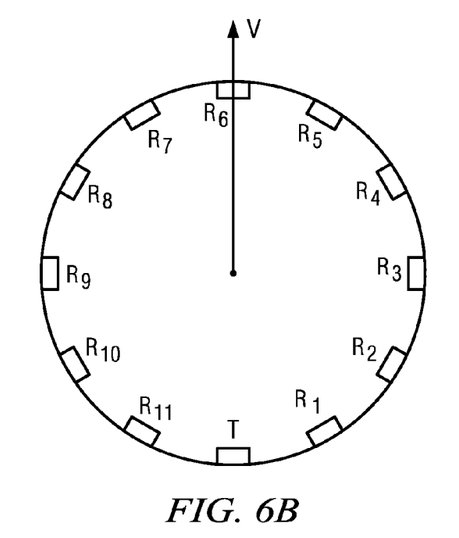
Figure 7:
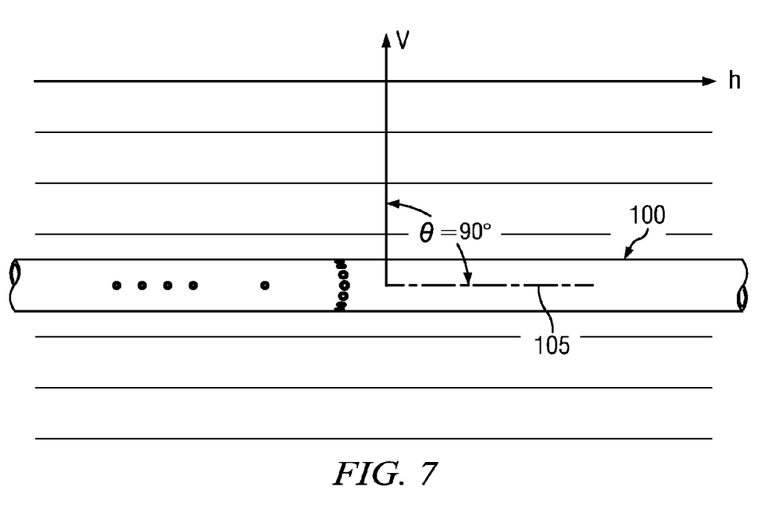
FIG. 7 depicts a special case in which the borehole is orthogonal with the vertical axis and aligned with the horizontal plane.
Figure 8:
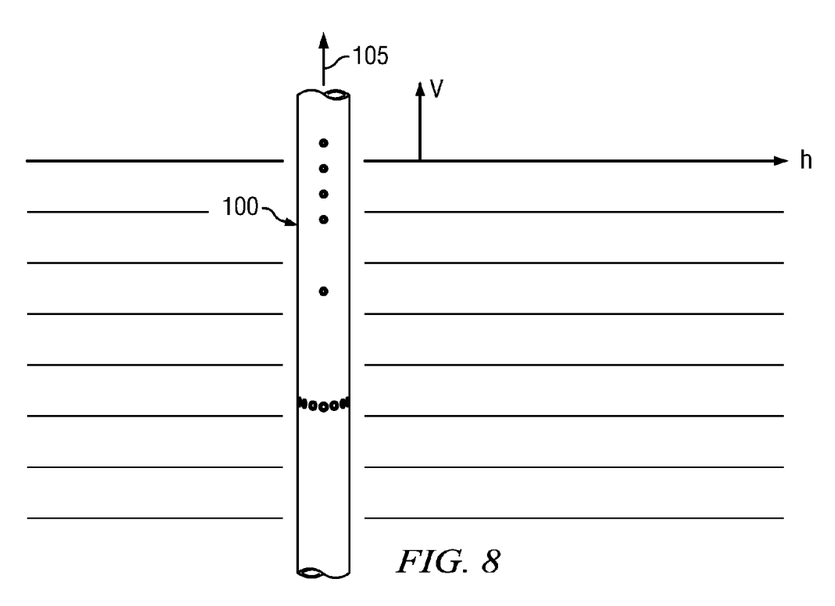
FIG. 8 depicts another special case in which the borehole is aligned with the vertical axis.

FIGS. 6-8 depict an acoustic logging tool deployed in a transversely isotropic formation. The formation may be thought of as having a vertical axis V and a horizontal plane H. It will be understood, however, that the vertical axis V and the horizontal plane H are not necessarily aligned with the vertical and horizontal directions as defined in the Earth's reference frame (as sedimentary layers are commonly tilted with respect to the Earth's reference frame). The special case in which the vertical axis V is aligned with the vertical direction in the Earth's reference frame is referred to in the art as vertical transverse isotropy (VTI). Example method embodiments are now described in more detail with respect to FIGS. 6-8.

FIGS. 6A and 6B depict a general case in which the borehole (and therefore the acoustic logging tool) is deviated with respect to the vertical axis V and is not parallel with the horizontal plane H. As depicted on FIG. 6A, a longitudinal axis 105 of acoustic logging tool 100 is angularly offset from the vertical axis V by an angle θ. In a VTI formation (in which the vertical axis V is aligned with the vertical direction in the Earth's reference frame), θ is equal to the borehole inclination (although the disclosed embodiments are by no means limited to such a special case). For axial acoustic measurements (e.g., made at 320), the measured compressional wave velocity may be related to certain of the elastic constants, for example, as follows:

$$2\rho V_{Pa}^2(\theta) = (c_{11} + c_{55})\sin^2\theta + (c_{33} + c_{55})\cos^2\theta + \sqrt{[(c_{11} - c_{55})\sin^2\theta - (c_{33} - c_{55})\cos^2\theta]^2 + 4(c_{13} + c_{55})^2 \sin^2\theta \cos^2\theta} \quad \text{Equation 8}$$

where $V_{Pa}$ represents the velocity of the compressional wave propagating in the axial direction and $c_{11}$, $c_{33}$, $c_{55}$, $c_{13}$, $\rho$, and θ are as defined above. The measured shear wave velocities may also be related to certain of the elastic constants, for example, as follows:

$$2\rho V_{SVa}^2(\theta) = (c_{11} + c_{55})\sin^2\theta + (c_{33} + c_{55})\cos^2\theta - \sqrt{[(c_{11} - c_{55})\sin^2\theta - (c_{33} - c_{55})\cos^2\theta]^2 + 4(c_{13} + c_{55})^2 \sin^2\theta \cos^2\theta} \quad \text{Equation 9}$$

$$2\rho V_{SHa}^2(\theta) = c_{66}\sin^2\theta + c_{55}\cos^2\theta \quad \text{Equation 10}$$

where $V_{SVa}$ represents the velocity of a shear wave propagating in the axial direction with polarization in the vertical direction and $V_{SHa}$ represents the velocity of a shear wave propagating in the axial direction with polarization in the horizontal direction.

For circumferential acoustic measurements (e.g., made at 330), the measured compressional wave and shear wave velocities depend on the azimuthal position (i.e., the tool face angle) of the individual receivers. The compressional wave velocity may be related to elastic constants, for example, as follows:

$$2\rho V_{PC}^2(\Theta) = (c_{11} + c_{55})\sin^2\Theta + (c_{33} + c_{55})\cos^2\Theta + \sqrt{[(c_{11} - c_{55})\sin^2\Theta - (c_{33} - c_{55})\cos^2\Theta]^2 + 4(c_{13} + c_{55})^2\sin^2\Theta\cos^2\Theta}$$

Equation 11 where $V_{Pc}$ represents the velocity of the compressional wave propagating around the circumference of the borehole (the direction of propagation may be thought of as being cross-axial) and $\Theta$ is the angle between the propagation vector $[x_R, y_R, z_R]$ at the receiver location R (e.g., receiver R3 in FIG. 6B) that is tangent to the borehole circumference and the vertical axis symmetry axis V of the transverse isotropic medium $[x_{TI}, y_{TI}, z_{TI}]$. It will be understood that each receiver has a unique azimuthal angle (and therefore a unique $\Theta$). For example, for receivers that are at the top or bottom of the tool for a horizontal well (i.e. aligned with the vertical axis V that goes through the center of the tool, where $\Theta=90$ or 270 degrees), Equation 11 reduces to $c_{11}=\rho V_{Pc}^2$.

The measured shear wave velocities may also be related to the elastic constants, for example, as follows:

$$2\rho V_{SVc}^2(\Theta) = (c_{11} + c_{55})\sin^2\Theta + (c_{33} + c_{55})\cos^2\Theta - \sqrt{[(c_{11} - c_{55})\sin^2\Theta - (c_{33} - c_{55})\cos^2\Theta]^2 + 4(c_{13} + c_{55})^2\sin^2\Theta\cos^2\Theta}$$

Equation 12

$$2\rho V_{SHc}^2(\Theta) = c_{66}\sin^2\Theta + c_{55}\cos^2\Theta$$

Equation 13 where $V_{SVc}$ represents the velocity of a shear wave propagating in the circumferential (cross-axial) direction with polarization in the vertical direction and $V_{SHc}$ represents the velocity of a shear wave propagating in the circumferential (cross-axial) direction with polarization in the horizontal direction. For example, for receivers that are at the top or bottom of the tool in a horizontal well (i.e. aligned with the vertical axis V that goes through the center of the tool, where $\Theta=90$ or 270 degrees), Equation 12 reduce to $c_{55}=\rho V_{SVc}^2$ (i.e. for the SV mode, the SH mode not being excited in this configuration).

It will be understood that at least five independent acoustic measurements are required to provide sufficient information to determine the five elastic constants of the transversely isotropic medium. These five independent measurements may be obtained, for example, by making axial and circumferential acoustic logging measurements in a deviated borehole (e.g., as depicted on FIGS. 6A and 6B). For example, compressional wave $V_{Pa}$ and shear wave $V_{SVa}$ and $V_{SHa}$ velocities may be measured via the axial acoustic measurements made at 320 to provide three independent measurements (and three independent equations). The circumferential acoustic measurements may be obtained at 330 to provide at least two additional independent measurements (and equations). For example, compressional wave velocities may be measured at a plurality of azimuthal angles (e.g., at $\Theta_1$ and $\Theta_2$ or at $\Theta_1$, $\Theta_2$, $\Theta_3$, and so on). Such circumferential compressional wave velocities are related to $c_{11}$, $c_{33}$, $c_{55}$, and $c_{13}$ as indicated in Equation 11. Likewise, shear wave velocities may also be obtained at a plurality of azimuth angles (e.g., at $\Theta_1$ and $\Theta_2$ or at $\Theta_1$, $\Theta_2$, $\Theta_3$, and so on). Such circumferential shear wave velocities are also related to the elastic constants as indicated in Equations 12 and 13. The plurality of azimuthal angles preferably includes at least one angle $\Theta$ that is not equal to 0, 90, 180, or 270 degrees. The circumferential acoustic measurements obtained at 330 may further include a compressional wave velocity and a shear wave velocity obtained at a single azimuthal angle that is not equal to 0, 90, 180, or 270 degrees with respect to a vertical axis V of the transversely isotropic medium. The acoustic velocities obtained via the axial acoustic measurements and the acoustic velocities obtained via the circumferential acoustic measurements may then be processed together to obtain the five elastic constants. The processing may include, for example, solving a system of equations such as Equations 8, 9, and 10 as well as multiple iterations of Equation 11 and/or Equation 12 at each of the multiple azimuth angles. Those of ordinary skill will readily appreciate that obtaining circumferential acoustic measurements at a large number of azimuthal angles (e.g., three or more) over specifies the system of equations and may therefore advantageously improve reliability (e.g., by providing redundant measurements).

FIG. 7 depicts a special case in which the borehole (and therefore the acoustic logging tool) is orthogonal with the vertical axis V and aligned with the horizontal plane H in the formation. For a VTI medium the borehole is horizontal in the Earth's reference frame (having an inclination of ninety degrees). For axial acoustic measurements (e.g., made at 320), the measured compressional wave velocity may be related to a single elastic constant, for example, as follows:

$$c_{11} = \rho V_{Pa}^2$$

Equation 14

The measured shear wave velocities may also be related to corresponding ones of the elastic constants, for example, as the tool is rotated around its axis both $c_{55}$ and $c_{66}$ may be determined as follows:

$$c_{55} = \rho V_{SVa}^2$$

Equation 15

$$c_{66} = \rho V_{SHa}^2$$

Equation 16

For circumferential acoustic measurements (e.g., made at 330), the measured compressional wave and shear wave velocities also depend on the azimuthal position of the individual receivers. The compressional wave velocity may be related to certain of the elastic constants, for example, as follows:

$$2\rho V_{PC}^2(\Theta) = (c_{11} + c_{55})\sin^2\Theta + (c_{33} + c_{55})\cos^2\Theta + \sqrt{[(c_{11} - c_{55})\sin^2\Theta - (c_{33} - c_{55})\cos^2\Theta]^2 + 4(c_{13} + c_{55})^2\sin^2\Theta\cos^2\Theta}$$

Equation 17 where $V_{Pc}$ and $\Theta$ are as defined above. The measured shear wave velocities may also be related to the elastic constants, for example, as follows:

$$2\rho V_{SVc}^2(\Theta) = (c_{11} + c_{55})\sin^2\Theta + (c_{33} + c_{55})\cos^2\Theta - \sqrt{[(c_{11} - c_{55})\sin^2\Theta - (c_{33} - c_{55})\cos^2\Theta]^2 + 4(c_{13} + c_{55})^2\sin^2\Theta\cos^2\Theta}$$

Equation 18 where $V_{SVc}$ is as defined above.

As stated above, at least five independent acoustic measurements are required to provide sufficient information to determine the five elastic constants of the transversely isotropic medium. These five independent measurements may also be obtained for the special case depicted on FIG. 7. For example, the $V_{Pa}$, $V_{SVa}$, and $V_{SHa}$ velocities may be obtained via the axial acoustic measurements to compute $c_{11}$, $c_{55}$, and $c_{66}$ per Equations 14-16. The circumferential acoustic measurements may be obtained at 330 to provide at least two additional independent measurements from which $c_{33}$ and $c_{13}$ may be computed. For example, circumferential compressional wave and/or shear wave velocities may be obtained at a plurality of azimuthal angles (e.g., at $\Theta_1$ and $\Theta_2$ or $\Theta_1$, $\Theta_2$, $\Theta_3$, and so on) as described above. Such circumferential compressional wave velocities are related to $c_{11}$, $c_{33}$, $c_{55}$, and $c_{13}$ as indicated in Equations 17 and 18.

FIG. 8 depicts another special case in which the borehole (and therefore the acoustic logging tool) is aligned (and therefore not deviated) with the vertical axis V. For a VTI medium the borehole is vertical in the Earth's reference frame (having an inclination of zero). For axial acoustic measurements (e.g., made at 320), the measured compressional wave velocity may be related to a single elastic constant, for example, as follows:

$$c_{33} = \rho V_{Pa}^2 \quad \text{Equation 19}$$

The measured shear wave velocities may also be related to corresponding ones of the elastic constants, for example, as follows:

$$c_{55} = \rho V_{SVa}^2 = \rho V_{SHa}^2 \quad \text{Equation 20}$$

Using monopole Stoneley mode excitation and the processing of Stoneley dispersion curves known in the art, one may obtain from the low-frequency tube-wave a velocity that is related to $c_{66}$ For circumferential acoustic measurements (e.g., made at 330), the measured compressional wave and shear wave velocities are independent of the azimuthal position (i.e., the tool face angle) of the individual receivers when the borehole is aligned with the vertical axis V of the transversely isotropic formation. The circumferential compressional wave velocity may be related to a single elastic constant, for example, as follows:

$$c_{11} = \rho V_{Pc}^2 \quad \text{Equation 21}$$

The measured shear wave velocity may also be related to a corresponding elastic constant, for example, as follows:

$$c_{66} = \rho V_{SHc}^2 \quad \text{Equation 22}$$

As such this specific configuration does not provide five independent velocity measurements and therefore does not provide for a direct measurement of $c_{13}$ (although $c_{13}$ may be estimated using a physical or heuristic model).

While not depicted on FIGS. 2-4, acoustic logging tools 100 and 200 may further include a controller, e.g., having a programmable processor (not shown), such as a microprocessor or a microcontroller and processor-readable or computer-readable program code embodying logic. The controller may be configured, for example, to execute method 300. For example, the controller may be configured to cause the acoustic logging to acquire axial and circumferential acoustic logging measurements. The controller may be further configured to process the axial and acoustic logging measurements to obtain the elastic constants, for example, via Equations 8-18. A suitable controller may also optionally include other controllable components, such as sensors, data storage devices, power supplies, timers, and the like. A suitable controller may also optionally communicate with other instruments in the drill string, such as, for example, telemetry systems that communicate with the surface for transmitting the computed elastic constants to the surface. A typical controller may further optionally include volatile or non-volatile memory or a data storage device. Alternatively, the acquired raw sensor data (or pre-processed data) may be sent to the surface, for example, via a high-speed wired drill string and then processed at the surface.

Although downhole elastic anisotropy measurements and certain advantages thereof have been described in detail, it should be understood that various changes, substitutions and alternations can be made herein without departing from the spirit and scope of the disclosure as defined by the appended claims.

What is claimed is:

1. A method for making downhole acoustic measurements of a subterranean formation, the method comprising:
   (a) deploying an acoustic logging tool in a deviated borehole;
   (b) causing the acoustic logging tool to obtain axial acoustic logging measurements;
   (c) causing the acoustic logging tool to obtain circumferential acoustic logging measurements; and
   (d) causing a processor to process the axial acoustic logging measurements and the circumferential acoustic logging measurements to compute each of five elastic constants of a transversely isotropic medium, wherein computing the five elastic constants comprises solving a system of at least five equations, the five equations relating the axial acoustic logging measurements, the circumferential acoustic logging measurements, and the five elastic constants; wherein the acoustic logging tool includes at least one acoustic transmitter, a first array of axially spaced apart receivers, and a second array of circumferentially spaced apart receivers, the second array being axially spaced apart from the first array; and wherein the system of at least five equations comprises at least the following equations:

$$2\rho V_{Pa}^2(\theta) = (c_{11} + c_{55})\sin^2\theta + (c_{33} + c_{55})\cos^2\theta + \sqrt{[(c_{11} - c_{55})\sin^2\theta - (c_{33} - c_{55})\cos^2\theta]^2 + 4(c_{13} + c_{55})^2\sin^2\theta\cos^2\theta} \quad (1)$$

$$2\rho V_{SVa}^2(\theta) = (c_{11} + c_{55})\sin^2\theta + (c_{33} + c_{55})\cos^2\theta - \sqrt{[(c_{11} - c_{55})\sin^2\theta - (c_{33} - c_{55})\cos^2\theta]^2 + 4(c_{13} + c_{55})^2\sin^2\theta\cos^2\theta} \quad (2)$$

$$2\rho V_{SHa}^2(\theta) = c_{66}\sin^2\theta + c_{55}\cos^2\theta \quad (3)$$

$$2\rho V_{Pc}^2(\Theta_1) = (c_{11} + c_{55})\sin^2\Theta_1 + (c_{33} + c_{55})\cos^2\Theta_1 + \sqrt{[(c_{11} - c_{55})\sin^2\Theta_1 - (c_{33} - c_{55})\cos^2\Theta_1]^2 + 4(c_{13} + c_{55})^2\sin^2\Theta_1\cos^2\Theta_1} \quad (4)$$

$$2\rho V_{Pc}^2(\Theta_2) = (c_{11} + c_{55})\sin^2\Theta_2 + (c_{33} + c_{55})\cos^2\Theta_2 + \sqrt{[(c_{11} - c_{55})\sin^2\Theta_2 - (c_{33} - c_{55})\cos^2\Theta_2]^2 + 4(c_{13} + c_{55})^2\sin^2\Theta_2\cos^2\Theta_2} \quad (5)$$

wherein $V_{Pa}$ represents a velocity of the compressional wave propagating in the axial direction, $V_{SVa}$ represents a velocity of a shear wave propagating in the axial direction with polarization in a vertical direction, $V_{SHa}$ represents a velocity of a shear wave propagating in the axial direction with polarization in a horizontal direction, $V_{Pc}$ represents a velocity of a compressional wave propagating in a circumferential direction, $\theta$ represents an angular offset between a longitudinal axis of the acoustic logging tool and a vertical axis of the transversely isotropic medium, $\Theta_1$ represents an angle between a propagation vector at a circumferential position of a first circumferential receiver and the vertical axis of the transversely isotropic medium, $\Theta_2$ represents an angle between a propagation vector at a circumferential position of a second circumferential receiver and the vertical axis of the transversely isotropic medium, $\rho$ represents a density of the subterranean formation, and $c_{11}$, $c_{33}$, $c_{55}$, $c_{66}$, and $c_{13}$ represent the five elastic constants.

2. A method for making downhole acoustic measurements of a subterranean formation, the method comprising:
   (a) deploying an acoustic logging tool in a deviated borehole;
   (b) causing the acoustic logging tool to obtain axial acoustic logging measurements;
   (c) causing the acoustic logging tool to obtain circumferential acoustic logging measurements; and
   (d) causing a processor to process the axial acoustic logging measurements and the circumferential acoustic logging measurements to compute each of five elastic constants of a transversely isotropic medium, wherein computing the five elastic constants comprises solving a system of at least five equations, the five equations relating the axial acoustic logging measurements, the circumferential acoustic logging measurements, and the five elastic constants; wherein the acoustic logging tool includes at least one acoustic transmitter, a first array of axially spaced apart receivers, and a second array of circumferentially spaced apart receivers, the second array being axially spaced apart from the first array; and
wherein the system of at least five equations comprises at least the following equations:

$$2\rho V_{Pa}^2(\theta) = (c_{11} + c_{55})\sin^2\theta + (c_{33} + c_{55})\cos^2\theta + \sqrt{[(c_{11} - c_{55})\sin^2\theta - (c_{33} - c_{55})\cos^2\theta]^2 + 4(c_{13} + c_{55})^2\sin^2\theta\cos^2\theta} \quad (1)$$

$$2\rho V_{SVa}^2(\theta) = (c_{11} + c_{55})\sin^2\theta + (C_{33} + C_{55})\cos^2\theta - \sqrt{[(c_{11} - c_{55})\sin^2\theta - (c_{33} - c_{55})\cos^2\theta]^2 + 4(c_{13} + c_{55})^2\sin^2\theta\cos^2\theta} \quad (2)$$

$$2\rho V_{SHa}^2(\theta) = c_{66}\sin^2\theta + c_{55}\cos^2\theta \quad (3)$$

$$2\rho V_{PC}^2(\Theta) = (c_{11} + c_{55})\sin^2\Theta + (c_{33} + c_{55})\cos^2\Theta + \sqrt{[(c_{11} - c_{55})\sin^2\Theta - (c_{33} - c_{55})\cos^2\Theta]^2 + 4(c_{13} + c_{55})^2\sin^2\Theta\cos^2\Theta} \quad (4)$$

$$2\rho V_{SVc}^2(\Theta) = (c_{11} + c_{55})\sin^2\Theta + (c_{33} + c_{55})\cos^2\Theta - \sqrt{[(c_{11} - c_{55})\sin^2\Theta - (c_{33} - c_{55})\cos^2\Theta]^2 + 4(c_{13} + c_{55})^2\sin^2\Theta\cos^2\Theta} \quad (5)$$

wherein $V_{Pa}$ represents a velocity of the compressional wave propagating in the axial direction, $V_{SVa}$ represents a velocity of a shear wave propagating in the axial direction with polarization in a vertical direction, $V_{SHa}$ represents a velocity of a shear wave propagating in the axial direction with polarization in a horizontal direction, $V_{Pc}$ a velocity of a compressional wave propagating in a circumferential direction, $V_{SVc}$ represents a velocity of a shear wave propagating in a circumferential direction, $\theta$ represents an angular offset between a longitudinal axis of the acoustic logging tool and a vertical axis of the transversely isotropic medium, $\Theta$ represents an angle between a propagation vector at a circumferential position of a circumferential receiver and the vertical axis of the transversely isotropic medium, $\rho$ represents a density of the subterranean formation, and $c_{11}$, $c_{33}$, $c_{55}$, $c_{66}$, and $c_{13}$ represent the five elastic constants.

3. A method for making downhole acoustic measurements of a subterranean formation, the method comprising:
   (a) deploying an acoustic logging tool in a deviated borehole;
   (b) causing the acoustic logging tool to obtain axial acoustic logging measurements;
   (c) causing the acoustic logging tool to obtain circumferential acoustic logging measurements; and
   (d) causing a processor to process the axial acoustic logging measurements and the circumferential acoustic logging measurements to compute each of five elastic constants of a transversely isotropic medium, wherein computing the five elastic constants comprises solving a system of at least five equations, the five equations relating the axial acoustic logging measurements, the circumferential acoustic logging measurements, and the five elastic constants; wherein the acoustic logging tool includes at least one acoustic transmitter, a first array of axially spaced apart receivers, and a second array of circumferentially spaced apart receivers, the second array being axially spaced apart from the first array; and
wherein the system of at least five equations comprises at least the following equations:

$$2\rho V_{Pa}^2(\theta) = (c_{11} + c_{55})\sin^2\theta + (c_{33} + c_{55})\cos^2\theta + \sqrt{[(c_{11} - c_{55})\sin^2\theta - (c_{33} - c_{55})\cos^2\theta]^2 + 4(c_{13} + c_{55})^2\sin^2\theta\cos^2\theta} \quad (1)$$

$$2\rho V_{SVa}^2(\theta) = (c_{11} + c_{55})\sin^2\theta + (C_{33} + C_{55})\cos^2\theta - \sqrt{[(c_{11} - c_{55})\sin^2\theta - (c_{33} - c_{55})\cos^2\theta]^2 + 4(c_{13} + c_{55})^2\sin^2\theta\cos^2\theta} \quad (2)$$

$$2\rho V_{SHa}^2(\theta) = c_{66}\sin^2\theta + c_{55}\cos^2\theta \quad (3)$$

$$2\rho V_{Svc}^2(\Theta_1) = (c_{11} + c_{55})\sin^2\Theta_1 + (c_{33} + c_{55})\cos^2\Theta_1 + \sqrt{[(c_{11} - c_{55})\sin^2\Theta_1 - (c_{33} - c_{55})\cos^2\Theta_1]^2 + 4(c_{13} + c_{55})^2\sin^2\Theta_1\cos^2\Theta_1} \quad (4)$$

$$2\rho V_{Svc}^2(\Theta_2) = (c_{11} + c_{55})\sin^2\Theta_2 + (c_{33} + c_{55})\cos^2\Theta_2 - \sqrt{[(c_{11} - c_{55})\sin^2\Theta_2 - (c_{33} - c_{55})\cos^2\Theta_2]^2 + 4(c_{13} + c_{55})^2\sin^2\Theta_2\cos^2\Theta_2} \quad (5)$$

wherein $V_{Pa}$ represents a velocity of the compressional wave propagating in the axial direction, $V_{SVa}$ represents a velocity of a shear wave propagating in the axial direction with polarization in a vertical direction, $V_{SHa}$ represents a velocity of a shear wave propagating in the axial direction with polarization in a horizontal direction, $V_{SVc}$ represents a velocity of a shear wave propagating in a circumferential direction, $\theta$ represents an angular offset between a longitudinal axis of the acoustic logging tool and a vertical axis of the transversely isotropic medium, $\Theta_1$ represents an angle between a propagation vector at a circumferential position of a first circumferential receiver and the vertical axis of the transversely isotropic medium, $\Theta_2$ represents an angle between a propagation vector at a circumferential position of a second circumferential receiver and the vertical axis of the transversely isotropic medium, $\rho$ represents a density of the subterranean formation, and $c_{11}$, $c_{33}$, $c_{55}$, $c_{66}$ and $c_{13}$ represent the five elastic constants.

* * * * *